(12) United States Patent
Li et al.

(10) Patent No.: US 6,963,378 B2
(45) Date of Patent: Nov. 8, 2005

(54) METHOD AND APPARATUS FOR REDUCTION OF VISUAL CONTENT

(75) Inventors: Zhu Li, Palatine, IL (US); Bhavan Gandhi, Vernon Hills, IL (US); Aggelos K. Katsaggelos, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 18 days.

(21) Appl. No.: 10/286,283

(22) Filed: Nov. 1, 2002

(65) Prior Publication Data

US 2004/0085483 A1 May 6, 2004

(51) Int. Cl.$^7$ .............................. H04N 5/14; H04N 9/64
(52) U.S. Cl. ..................................................... 348/700
(58) Field of Search .......................... 348/700; 375/240, 375/240.01, 240.21; 382/173; 725/41

(56) References Cited

U.S. PATENT DOCUMENTS

| | | | |
|---|---|---|---|
| 5,635,982 A | * | 6/1997 | Zhang et al. .......... 348/231.99 |
| 5,835,163 A | * | 11/1998 | Liou et al. ................... 348/700 |
| 5,995,095 A | | 11/1999 | Ratakonda |
| 6,055,025 A | * | 4/2000 | Shahraray .................... 348/700 |
| 6,549,643 B1 | * | 4/2003 | Toklu et al. ................. 382/107 |
| 6,697,523 B1 | * | 2/2004 | Divakaran et al. .......... 382/173 |
| 6,771,268 B1 | * | 8/2004 | Crinon ........................ 345/475 |
| 2001/0020981 A1 | | 9/2001 | Jun et al. |
| 2002/0051010 A1 | * | 5/2002 | Jun et al. ..................... 345/723 |

OTHER PUBLICATIONS

A. Jaimes and S. Chang, "A Conceptual Framework for Indexing Visual Information at Multiple Levels, IS&T/SPIE Internet Imaging," vol. 3964, San Jose, CA, Jan. 2000 (14 pages).

N. Vasconcelos and A. Lippman, "Statistical Models of Video Structure for Content Analysis and Characterization," IEEE Transactions On Image Processing, vol. 9, No. 1, Jan. 2000, pp. 3–19.

B. S. Manjunath, J. Ohm, V. V. Vasudevan, and A. Yamada, "Color and Texture Descriptors," IEEE Transactions On Circuits And Systems For Video Technology, vol. 11, No. 6, Jun. 2001, pp. 703–715.

S. Jeannin and A. Divakaran, "MPEG–7 Visual Motion Descriptors," IEEE Trans–actions On Circuits And Systems For Video Technology, vol. 11, No. 6, Jun. 2001, pp. 720–724.

ISO/IEC FDIS 15938–3, Information Technology—Multimedia Content Description Interface—Part 3 Visual, International Organization For Standardization, ISO/IEC JTC1/SC29/WG11, Coding Of Moving Pictures And Associated Video, ISO/IEC JTC1/SC29/WG11/N4358 Jul. 2001 (Sydney), pp. 1–187.

* cited by examiner

Primary Examiner—John Miller
Assistant Examiner—Erick Rekstad
(74) Attorney, Agent, or Firm—Fitch, Even, Tabin & Flannery

(57) ABSTRACT

At least one visual significance metric is determined (12) for at least some frames belonging to an original series of frames (11). Key frames are identified (13) as a function, at least in part, of the visual significance metric. Cumulative visual significance values are then determined (14) for at least some of the frames that intervene between each pair of key frames. These cumulative visual significance values are then used to identify (15) frames of additional content interest. Various frames are then selected (16) for use in a visual summary. In one embodiment, all of the key frames and frames of additional content interest are selected for inclusion in the visual summary.

19 Claims, 3 Drawing Sheets

METHOD AND APPARATUS FOR REDUCTION OF VISUAL CONTENT

TECHNICAL FIELD

This invention relates generally to visual information processing.

BACKGROUND

Video information can be provided in many forms including sequences of video images that, when displayed in a sufficiently rapid fashion, present convincingly moving images. In some circumstances, video information (and particularly moving video information) can comprise a voluminous quantity of information. For example, a videotape that includes the output of a surveillance camera in a store can store and represent hours of surveillance information. There are times when a reviewer will wish to determine when and if something of interest has been recorded on such a videotape. In the past, such a reviewer must usually either review the entire tape in real time playback, or utilize a fast-forward/preview feature to attempt to locate the video information of interest in a more rapid fashion.

There are times when such techniques do not produce acceptable results, either because the review requires too much time or because the information of interest is not reliably noted. In an attempt to address these concerns, other prior art techniques seek to provide a corresponding video sequence summary that essentially provides a temporal thumbnail representation of the original video sequence. Such a summary typically requires reduced storage requirements and can be viewed in a reduced amount of time as compared to the original video sequence. When the summarization technique utilizes only time-based frame/video content reduction, however, the resultant summary may well exclude video content of importance and/or concern to a future viewer. Some content-based abridgement techniques have been suggested, but in general many such techniques tend to be quite computationally complex (with some even requiring multiple iterations of the content-reduction process). Other techniques seem better attuned to classifying a given video sequence instead of yielding a resultant video summary. As a result, a content-based mechanism or process to automatically yield a generally useful video summary of a given plurality of graphic images in a relatively non-complex fashion and at reasonable cost remains unmet.

BRIEF DESCRIPTION OF THE DRAWINGS

The above needs are at least partially met through provision of the method and apparatus for reduction of visual content described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, an estimator provides a first significance metric for at least some of the frames in an original plurality of sequential frames of video information. The estimator identifies those frames having a corresponding significance metric that has at least a predetermined relationship with respect to at least a first video significance threshold value as being key frames (for example, in a preferred embodiment, the estimator identifies as key frames those frames having a significance metric that at least equals a predetermined threshold). The estimator then determines a cumulative significance value for at least some of the frames that fall between a pair of the key frames. In a preferred embodiment, the estimator essentially integrates over time a second corresponding significance metric for each such frame. These resulting values are then compared against a set of iteratively increasing thresholds to identify frames of interest. A video summary generator then generates a video summary comprising key frames and at least some of these other frames of interest (presuming, of course, that the video content contains sufficient information of interest and/or that the thresholds are not set so high as to essentially exclude all candidate content). The resultant summary will typically include visual content of interest and value while deleting relatively static content.

The degree of effective time compression can be scaled relatively easily by appropriate selection of the various thresholds noted above. Depending upon the needs of a given application, the iteratively increasing thresholds can increase in a linear fashion or a non-linear fashion. In addition, the increases can proceed pursuant to a fixed schedule and/or can increase pursuant to a content-sensitive dynamic scheme.

In a preferred embodiment, the significance metrics reflect at least one of changes in position/motion and/or color in the visual content from one frame to another. Such a metric therefore tends to reflect either movement and/or a change of scene. Generally speaking, such a process can be effected automatically and in near real-time to the original image capture, thereby potentially reducing storage requirements and facilitating rapid review by an observer without necessarily requiring extensive pre-processing.

Figure 1:
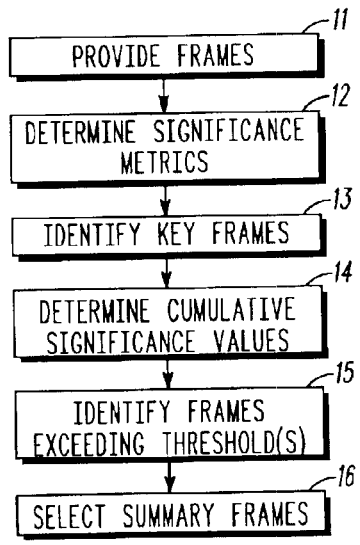
FIG. 1 comprises a general flow diagram as configured in accordance with an embodiment of the invention.

Referring now to FIG. 1, as already noted, a plurality of frames that contain at least video information are provided 11. In a preferred embodiment, these frames will comprise frames of video information that will represent an animated scenario when displayed sequentially in accordance with well-understood prior art technique. It should be understood, however, that these embodiments may also be useful with other kinds of graphic information. Therefore these embodiments should not be viewed as being limited to standard motion video methodologies.

One or more significance metrics are then determined 12 for at least some of these frames (and preferably all of the frames). In a preferred embodiment, the significance metric represents detection of a change to position, color, or both as pertains to the graphic content of a given frame. Preferably, the metric represents a comparison between the graphic content of a given frame and a previous frame in the sequence of frames (most preferably, the given frame will be compared with a most-recent sequentially previous frame). Other indicia (such as changes to texture) could also be used, alone or in combination, with these criteria as desired. In general, the indicia should be representative of either a scene change and/or motion of one or more depicted objects. So selected, the metric should tend, in a preferred approach, to yield a higher value as the degree and/or overall quantity of movement or other changes from one frame to the next increases.

The process then provides for identification 13 of frames that appear to represent a significant change in content as compared to a previous frame. For example, the first frame that represents a change of scene in an edited presentation will tend to represent a significant change of visual content as compared to the last frame of the previous scene. As another example, consider a surveillance film of a point-of-sale location in a store. The first frame when a patron first enters the scene will often represent a significant visual change from the preceding frame. Such frames are identified by comparing the significance metric determined above with a first video significance threshold value. This first video significance threshold value can be set as desired and appropriate to a given application, but in general should preferably be set high enough to typically permit accurate identification of such frames that appear to capture the initiation of a significant scene change and/or action sequence. For purposes of this description, such frames are referred to as key frames.

It will be observed that a first frame in a sequence of frames has no preceding frame or frames with which it can be compared. In a preferred embodiment, the first frame in a sequence of frames will nevertheless always be treated as a key frame. There are situations, however, when one might wish to operate in a different fashion. For example, if the opening frame is substantially identical to the next 10,000 frames, virtually any of those frames could be selected as a key frame with substantially similar results being expected with respect to the resultant summary produced below. In general, however, and especially for ease of automation and reduced computational complexity, selection of the first frame as a key frame will tend to support effective summarization results.

Cumulative visual significance values are then determined 14 for most (and preferably all) of the frames (or at least those frames that were not previously identified as being key frames). In a preferred approach, these cumulative visual significance values are accumulated with respect to frames that intervene between two key frames. Also preferably, these values are accumulated with respect to all of the frames that so intervene. A more detailed example will be provided below with respect to one approach to forming such cumulative significance values.

The process then identifies 15 those particular frames that have a corresponding cumulative visual significance value that at least equals a predetermined threshold value. In a preferred embodiment, a series of thresholds that increase in an incremental fashion are used to identify the frames of interest in this way. For example, a first threshold having value X may be used to identify a first frame in a sequence of frames following a given key frame that at least equals this threshold X. Upon identifying this frame, the threshold can then be increased by a known amount (for example, the threshold can be doubled to thereby provide a threshold of 2X). The identification process can then be continued to determine if any subsequent frame (prior to the next key frame) will at least equal this new threshold 2X. Upon identifying such a frame, the threshold can then be increased again (for example, by tripling the threshold to provide a threshold of 3X) and the comparison process continued. In this way, frames having a cumulative visual significance value that at least equals an increasing threshold value are identified between each pair of key frames.

Those identified frames, along with the key frames, are then selected 16 in a preferred embodiment as frames to be used to comprise a visual summary of the original sequence of frames. For example, these selected frames can be displayed in accord with the original frame rate for the original sequence of frames. Since this process typically results in the removal of a considerable number of frames (i.e., all frames that are not key frames and/or that are not otherwise selected), the corresponding resultant summary video will be viewable in a considerably shortened period of time.

Notwithstanding a significant compression of time that can be achieved with such a process, the resultant summary video tends to be inclusive of content of interest. This occurs at least in part because the frames that are selected for inclusion in the summary tend to either be frames that begin a new scene or frames that otherwise represent a considerable change from a previous frame(s). As a result, frames that contain redundant visual information tend to be excluded from the summary while frames that include new visual information tend to be included. In some settings, such as reviewing a surveillance tape, the resultant time compression can be significant while simultaneously preserving considerable content of potential interest.

Figure 2:
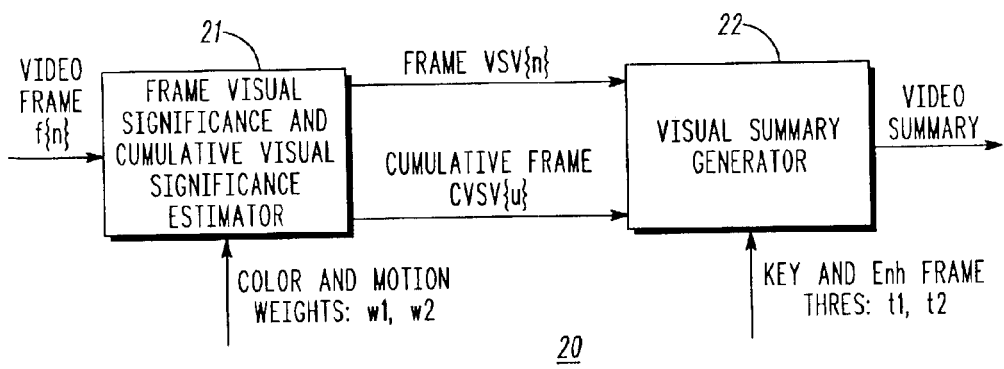
FIG. 2 comprises a block diagram as configured in accordance with an embodiment of the invention.

These various embodiments can be effected through various means. Referring now to FIG. 2, a particular illustrative embodiment will be described. FIG. 2 depicts a high level block diagram of a system 20 that can support generation of video summaries as per the above embodiments. A Frame Visual Significance and Cumulative Visual Significance Estimator 21 takes the input video frames along with weighting factors (w1 and w2) to compute visual significance values VSV and cumulative visual significance values CVSV as noted above. The VSV and CVSV results are input to a Video Summary Generator 22 along with threshold values (t1 and t2) to generate a corresponding video summary.

Figure 3:
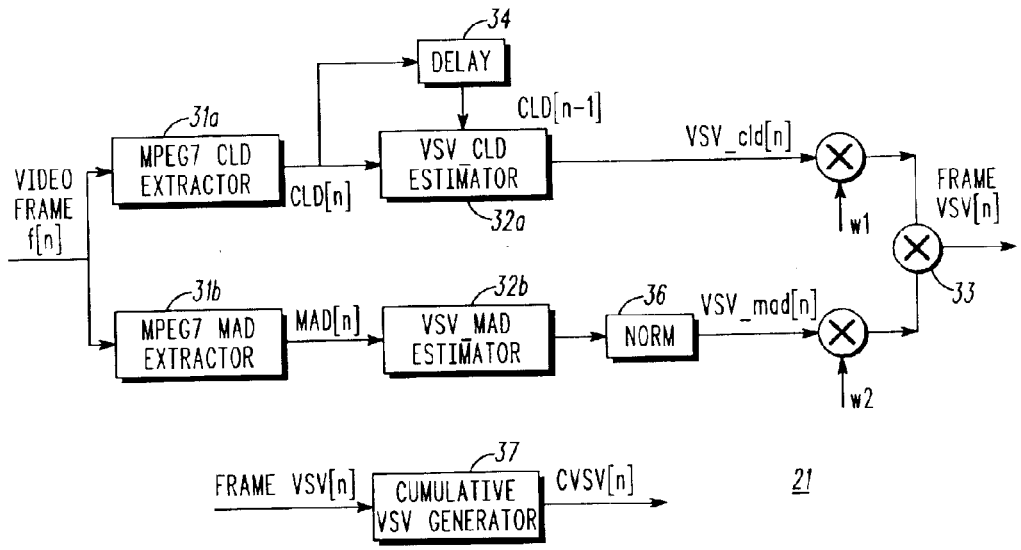
FIG. 3 comprises a detailed block diagram of a frame visual significance and cumulative visual significance estimator as configured in accordance with an embodiment of the invention.

FIG. 3 presents a detailed representation of the Frame Visual Significance and Cumulative Visual Significance Estimator 21. In this embodiment, Color Layout Descriptor (CLD) and Motion Activity Descriptor (MAD) (as these descriptors are defined by the well known standard MPEG-7) Extractors 31A and 31B respectively process the input video frames to obtain representative CLD and MAD descriptions. Estimators 32A and 32B then generate visual significance value functions using the CLD and MAD descriptions independently, VSV_cld and VSV_mad respectively. The overall visual significance value for a given frame n, VSV[n], is computed in this embodiment as a weighted sum 33 of VSV_cld[n] and VSV_mad[n], as shown in equation (1).

$$VSV[n]=w1*VSV\_cld[n]+w2*VSV\_mad[n] \quad (1)$$

The weighting values w1 and w2 reflect the relative importance of VSV_cld and VSV_mad respectively and can be selected as appropriate to a given application or visual setting/context (for example, when motion information is more likely to accompany visual content of interest than changes to color information, these weighting factors can be altered accordingly).

VSV_cld[n] is computed as a distance between the CLD of a current frame n and a just-previous frame n−1 (the latter being provided by an appropriate delay unit 34). The distance computation between CLDs can be as specified in the MPEG-7 Visual specification as understood by those skilled in these arts.

$$VSV\_cld[n]=Dis\tan ce(CLD\,[n],\,CLD\,[n-1]) \quad (2)$$

VSV_mad[n] is computed, in this embodiment, by the estimator 32B as the variance of the set of motion vectors, MV, within the frame n:

$$VSV\_mad[n] = (E[|MV(n)|^2] - E^2[|MV(n)|])/N_{MAD} \quad (3)$$

Again, the above reflects normalization using $N_{MAD}$ as a normalization factor by a second normalization unit 36. Generally, the value of $N_{MAD}$ is a function of frame size. In a preferred embodiment, $N_{MAD}$ is computed as the square root of the area of the frame. Where frameHeight is the height of the video frame in pixels and frameWidth is the width of the video frame in pixels:

$$N_{MAD} = \sqrt{frameHeight \times frameWidth} \quad (4)$$

A cumulative VSV generator 37 computes the cumulative visual significance value function, CVSV[n], from the VSV[n] function:

$$CVSV[n] = \begin{cases} \sum_{k=n0}^{n} VSV[n], & \text{When frame } n \text{ is not a key frame} \\ 0, & \text{When frame } n \text{ is a key frame, } n0 = n \end{cases} \quad (5)$$

In equation (4), n0 corresponds to the last frame, less than n, that is identified as a key frame by analyzing VSV[n].

Figure 4:
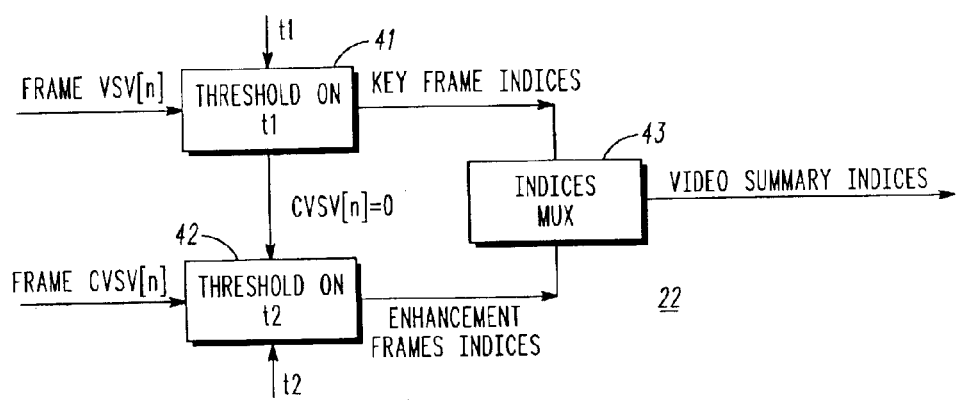
FIG. 4 comprises a detailed block diagram of a video summary generator as configured in accordance with an embodiment of the invention.

Referring now to FIG. 4, appropriate key frames and intervening enhancement frames are selected by processing VSV[n] and Cumulative Visual Significance CVSV[n].

Key frames are chosen when a first threshold test 41 indicates that VSV[n]>t1 (t1 being the first threshold described earlier). This corresponds to a significant change in frame content that typically corresponds to a scene change. The corresponding cumulative visual significance CVSV[n] is also set to zero when a key frame is so detected. This helps to prevent CVSV[n] over flow. Enhancement frames are chosen when a second threshold test 42 indicates that the increment of CVSV[n]>t2. This identifies an enhancement frame for a given amount of visual significance change. The values of the thresholds t1 and t2 should preferably correspond inversely to the number of key frames and enhancement frames directly. In general, with larger threshold values, the fewer the number of identified key frames and enhancement frames. Conversely, lower threshold values identify more key frames and enhancement frames.

The MUX unit 43 combines the identified key frames and enhancement frames to produce an overall video summary representation of the original video sequence.

In general, the thresholds t1 and t2 can be fixed, user specified, or computed to adapt locally to the video content. The thresholds t1 and t2 govern the temporal granularity of the key frames and the number enhancement frames within a video shot (i.e., in between key frames). In a preferred embodiment, threshold t2 will increment with each identified enhancement frame (until a key frame is again encountered, at which point the threshold can revert to the original lowest t2 value). In one embodiment, this threshold increments as a multiple of itself as already related above.

Without loss of generality, the video summaries may be encoded using known video compression methods such as H.263 and MPEG-4. These and other enabling embodiments can be realized through use of dedicated logic circuits and/or with programmable platforms such as microprocessors and microcontrollers as well understood in the art.

Figure 5:
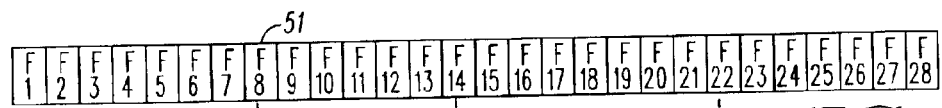
FIG. 5 comprises a schematic timing diagram of a plurality of visual image frames as configured in accordance with an embodiment of the invention.

Referring now to FIG. 5, an example will be set forth. In FIG. 5, an original series 51 of twenty-eight frames is provided. In this illustration, these frames F1 through F28 each include visual information as captured in a temporal sequence as with a motion picture camera. It should be understood that only twenty-eight frames are shown in this example for purposes of simplicity and clarity; in general, considerably more frames are to be expected.

Figure 6:
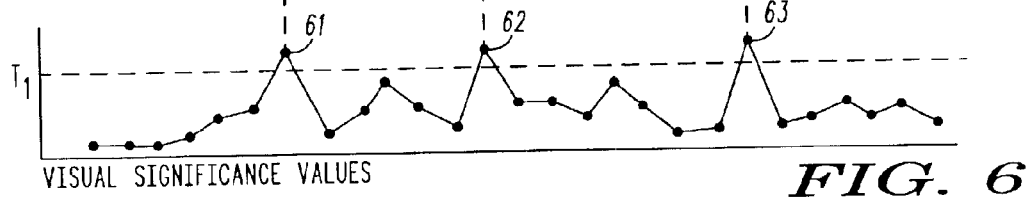
FIG. 6 comprises a graph of visual significance values that correspond to the frames of FIG. 5 as configured in accordance with an embodiment of the invention.
Figure 7:
FIG. 7 comprises a timing diagram depicting key frames as configured in accordance with an embodiment of the invention.

As related above, various embodiments provide a visual significance value for each of these frames. Such values are shown in FIG. 6 (in this example, a value has not been provided for the first frame F1 as explained above). Each of these values is then compared against a first threshold T1. In this example, three of the frames have a corresponding visual significance value that exceeds this threshold. In particular, frame F8 has a visual significance value 61 that exceeds this threshold T1, frame F14 has a visual significance value 62 that exceeds this threshold T1, and frame F22 has a visual significance value 63 that exceeds this threshold T1. As shown in FIG. 7, these frames (F8, F14, and F22) along with the first frame F1 are identified as key frames 71.

Figure 8:
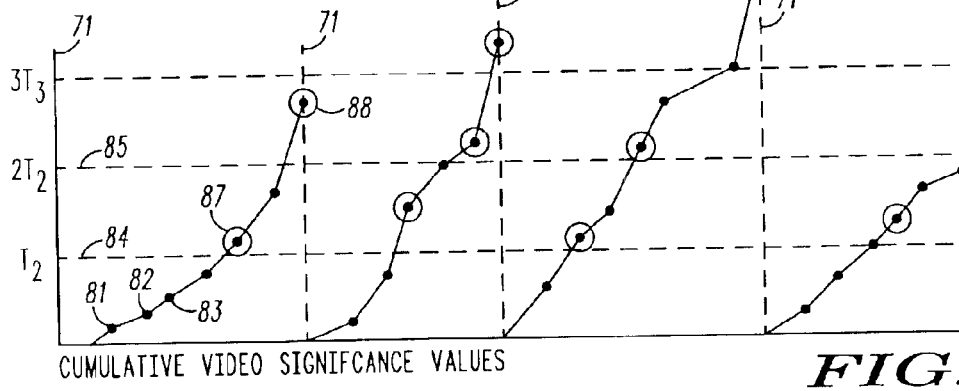
FIG. 8 comprises a graph of cumulative video significance values as correspond to the frames of FIG. 5 as configured in accordance with an embodiment of the invention.

Referring now to FIG. 8, the cumulative visual significance values for each frame that intervenes between each pair of key frames 71 are determined. In this example, the cumulative visual significance value 81 for frame F2 equals the visual significance value as was determined for that same frame. The cumulative visual significance value 82 for frame F3 equals the sum of the visual significance value for frame F3 and the cumulative visual significance value for frame F2. This accumulation of values continues, such that the cumulative visual significance value 83 for frame F4 comprises the sum of the visual significance value for frame F4 and the cumulative visual significance value for frame F3, until the next key frame 71 has been reached. With each key frame 71, the cumulative visual significance value is reset to a starting point value (in this example, a value of zero).

Beginning with an initial frame, the cumulative visual significance values are compared against a second threshold T2. In this example, the cumulative visual significance value 87 for frame F6 comprises the first frame having a cumulative visual significance value to at least equal the second threshold T2. This identifies this frame F6 as being an enhancement frame to be included in the final summary. Pursuant to this illustrative embodiment, the threshold is now incremented to a higher value. In particular, in this embodiment, the process now uses a threshold value of 2T2 85. The cumulative visual significance value 88 that corresponds to frame F8 is the next value to at least equal the new threshold setting. The process then selects this frame F8 as another enhancement frame to be included in the summary. Frame F8 was also a key frame 71. The process now returns to the original second threshold value 84 and begins the process anew of comparing the next series of cumulative visual significance values with the incrementally increasing threshold values.

Figure 9:
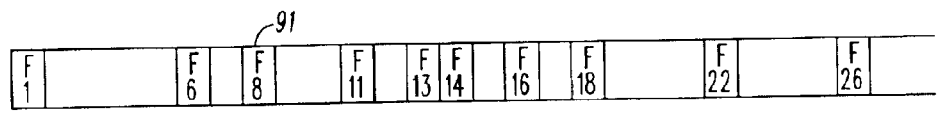
FIG. 9 comprises a schematic timing diagram of a reduced set of visual image frames as configured in accordance with an embodiment of the invention.

By proceeding in the above fashion, and as illustrated in FIG. 9, a number of frames 91 are selected for inclusion in a visual summary. In this example, frames F1, F6, F8, F11, F13, F14, F16, F18, F22, and F26 are so selected. A resultant visual summary would comprise these selected frames as presented in sequence without any intervening spaces. Such a visual summary will require less time to view as fewer frames are required for presentation. Notwithstanding this reduction in frames, considerable visual content of potential interest remains preserved as the processes described above tend to emphasize retention of frames that provide an indication of considerable motion or other metric of interest.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   providing a plurality of sequential frames of at least video information;
   determining a first corresponding significance metric for at least some of the plurality of sequential frames;
   identifying at least some of the plurality of sequential frames having a corresponding significance metric that has at least a predetermined relationship with respect to at least a first video significance threshold value to provide key frames;
   determining a cumulative significance value for at least some of the frames that fall between a given pair of the key frames by integrating over time a second corresponding significance metric for each such frame;
   identifying at least one of the frames that fall between a given pair of the key frames having a cumulative significance value that at least equals a predetermined threshold value to provide a first selected and frame;
   using all of the key frames and at least one selected frame to provide a corresponding video sequence.

2. The method of claim 1 wherein determining a first corresponding significance metric for at least some of the plurality of sequential frames includes detecting a change to at least one of motion and color as pertains to graphic content of the video information.

3. The method of claim 2 wherein detecting a change to at least one of motion and color as pertains to graphic content of the video information includes comparing graphic content of the video information of a given one of the sequential frames with graphic content of the video information of a sequentially previous one of the sequential frames.

4. The method of claim 3 wherein comparing graphic content of the video information of a given one of the sequential frames with graphic content of the video information of a sequentially previous one of the sequential frames includes comparing the graphic content of the given one of the sequential frames with the graphic content of a most-recent sequentially previous one of the sequential frames.

5. The method of claim 1 and further comprising identifying a first one of the plurality of sequential frames as also being one of the key frames regardless of whether the first one of the plurality of sequential frames has a corresponding significance metric that has at least the predetermined relationship with respect to at least the first video significance threshold value.

6. The method of claim 1 wherein identifying at least some of the plurality of sequential frames having a corresponding significance metric that has at least a predetermined relationship with respect to at least a first video significance threshold value includes identifying at least some of the plurality of sequential frames having a corresponding significance metric that exceeds the first video significance threshold value.

7. The method of claim 1 wherein identifying at least some of the plurality of sequential frames having a corresponding significance metric that has at least a predetermined relationship with respect to at least a first video significance threshold value includes identifying substantially all of the plurality of sequential frames having a corresponding significance metric that has at least a predetermined relationship with respect to at least a first video significance threshold value to provide key frames.

8. The method of claim 1 wherein determining a cumulative significance value for at least some of the frames that fall between a given pair of the key frames includes determining a cumulative significance value for each of substantially all of the frames that fall between the given pair of the key frames.

9. The method of claim 1 wherein identifying at least one of the frames that fall between a given pair of the key frames having a cumulative significance value that at least equals a predetermined threshold value to provide a first selected frame includes identifying a first sequential one of the frames that fall between a given pair of the key frames to have a cumulative significance value that at least equals a predetermined threshold value, if any, to provide a first selected frame.

10. The method of claim 9 and further comprising, for the frames that fall between a given pair of the key frames, identifying a second sequential one of the frames, if any, that is sequentially subsequent to the first selected frame and that has a cumulative significance value that at least equals a predetermined second threshold value to provide a second selected frame.

11. The method of claim 10 wherein the second threshold value comprises a doubling of the predetermined threshold value.

12. The method of claim 10 and further comprising, for the frames that fall between a given pair of the key frames:
   providing a plurality of incrementally larger threshold values;
   identifying a smallest one of the plurality of incrementally larger threshold values that has not yet been at least met by a corresponding cumulative significance value;
   identifying, in sequential order, a frame, if any, having a corresponding cumulative significance value that at least equals the smallest one of the plurality of threshold values to provide a corresponding selected frame;
   repeatedly incrementing to a next larger threshold value to provide an incremented threshold value and identifying, in sequential order, a frame subsequent to a most recently selected frame, if any, having a corresponding cumulative significance value that at least equals the incremented threshold value to provide another corresponding selected frame until there are no remaining subsequent frames before a terminating key frame.

13. The method of claim 1 wherein using all of the key frames and at least one selected frame to provide a corresponding video sequence includes not using any non-key frames and any non-selected frames to provide the corresponding video sequence.

14. A method to delete frames in a source video comprised of a plurality of frames, comprising:

identifying those frames, if any, that include content representing a substantial alteration as compared to at least a previous frame to provide first identified frames;

for each sequence of frames, if any, that are between each adjacent pair of the first identified frames, integrating over time a value that represents content alteration for each such frame to provide a cumulative alteration value for each such frame;

processing the cumulative alteration values for each sequence of frames that are between each adjacent pair of the first identified frames to identify second identified frames;

using all the first identified frames and at least one of the second identified frames to provide a resultant video having a fewer number of frames than the source video.

15. The method of claim 14 wherein processing the cumulative alteration values for each sequence of frames that are between each adjacent pair of the first identified frames to identify second identified frames includes:

providing a series of increasing threshold values;

using a first one of the series of increasing threshold values to identify a first selected frame, if any, in the sequence of frames that at least equals the first one of the series of increasing threshold values;

thereafter, as frames are sequentially selected, incrementally increasing the threshold value to further identify additional sequentially subsequent selected frames, if any, that at least equal the incrementally increased threshold values.

16. An apparatus comprising:

a frame extractor having an input that receives a video comprised of a plurality of frames and an output that provides individual frames;

a visual significance estimator having an input that receives the individual frames and an output that provides a metric that corresponds to a degree of content variance as between a given frame and at least one previous frame;

a key frame identifier having an input that receives the metric and an output that identifies those key frames having a corresponding metric representing a substantially high degree of content variation;

a cumulative visual significance estimator having an input that is operably coupled to the output of the visual significance estimator and the key frame identifier and having an output that provides a time-cumulative metric for at least some of the frames that intervene between each pair of the key frames; and a comparator having an input that receives the time-cumulative metrics and an output that identifies frames having a time-cumulative metric having at least a predetermined relationship with respect to a threshold to provide for selected frames;

wherein the key frames and at least one selected frame are used to provide a corresponding sequence.

17. The apparatus of claim 16 wherein the visual significance estimator comprises first estimator means for comparing visual content of the given slide against visual content of the at least one previous frame.

18. The apparatus of claim 16 wherein the cumulative visual significance estimator comprises second estimator means for integrating over time the metrics of a sequence of frames as are disposed between a pair of adjacent key frames to facilitate yield of the time-cumulative metric.

19. The apparatus of claim 16 and further comprising comparator means for comparing the time-cumulative metrics with a threshold, wherein the threshold is automatically increased following each comparison that yields a match with a given time-cumulative metric for a given corresponding frame.

* * * * *

UNITED STATES PATENT AND TRADEMARK OFFICE
CERTIFICATE OF CORRECTION

| | | |
|---|---|---|
| PATENT NO. | : 6,963,378 B2 | Page 1 of 1 |
| APPLICATION NO. | : 10/286283 | |
| DATED | : November 8, 2005 | |
| INVENTOR(S) | : Li et al. | |

It is certified that error appears in the above-identified patent and that said Letters Patent is hereby corrected as shown below:

In claim 1, column 7, line 51, change "and frame;" to --frame; and--

Signed and Sealed this

Third Day of October, 2006

JON W. DUDAS
*Director of the United States Patent and Trademark Office*